US012488080B2

(12) United States Patent
Lederer et al.

(10) Patent No.: US 12,488,080 B2
(45) Date of Patent: Dec. 2, 2025

(54) METHOD AND SYSTEM FOR USER AUTHENTICATION

(71) Applicant: Unify Patente GmbH & Co. KG, Munich (DE)

(72) Inventors: Thomas Lederer, Herrsching (DE); Christina Papadimitriou, Nea Ionia (GR)

(73) Assignee: Unify Patente GmbH & Co. KG, Munich (DE)

( * ) Notice: Subject to any disclaimer, the term of this patent is extended or adjusted under 35 U.S.C. 154(b) by 190 days.

(21) Appl. No.: 17/966,955

(22) Filed: Oct. 17, 2022

(65) Prior Publication Data

US 2023/0169160 A1    Jun. 1, 2023

(30) Foreign Application Priority Data

Nov. 30, 2021    (EP) .................................... 21211517

(51) Int. Cl.
*G06F 21/00* (2013.01)
*G06F 21/33* (2013.01)

(52) U.S. Cl.
CPC .................................... *G06F 21/33* (2013.01)

(58) Field of Classification Search
CPC .......... G06F 21/33; G06F 21/34; G06F 21/40; H04L 63/08; H04L 63/0807; H04L 63/0853; H04W 12/06; H04W 12/068; H04W 12/069

See application file for complete search history.

(56) References Cited

U.S. PATENT DOCUMENTS

| 2014/0101453 | A1  | 4/2014  | Senthurpandi |            |
|--------------|-----|---------|--------------|------------|
| 2015/0237045 | A1* | 8/2015  | Blessing     | H04W 12/065 |
|              |     |         |              | 705/311    |
| 2017/0346851 | A1  | 11/2017 | Drake        |            |
| 2022/0329581 | A1* | 10/2022 | Zaki         | G06F 9/451 |
| 2023/0004629 | A1* | 1/2023  | Aggarwal     | G06F 21/34 |

OTHER PUBLICATIONS

Extended European Search Report for European Application No. 21211517.4 dated Apr. 28, 2022.

* cited by examiner

*Primary Examiner* — Joseph P Hirl
*Assistant Examiner* — Chi D Nguy
(74) *Attorney, Agent, or Firm* — Buchanan Ingersoll & Rooney PC

(57) ABSTRACT

A method for user authentication during a connection between a first user and a second user can include receiving an authentication request from the first user for authenticating the second user, executing an authentication process of the first user, receiving contact data of the second user from the first user, sending a Token to the second user wherein the Token is based on and/or addressed by the contact data, requesting execution of an authentication process of the second user based on the Token, generating a result for the authentication process for the second user and providing the result of the authentication process of the second user to the first user and/or to the second user.

20 Claims, 2 Drawing Sheets

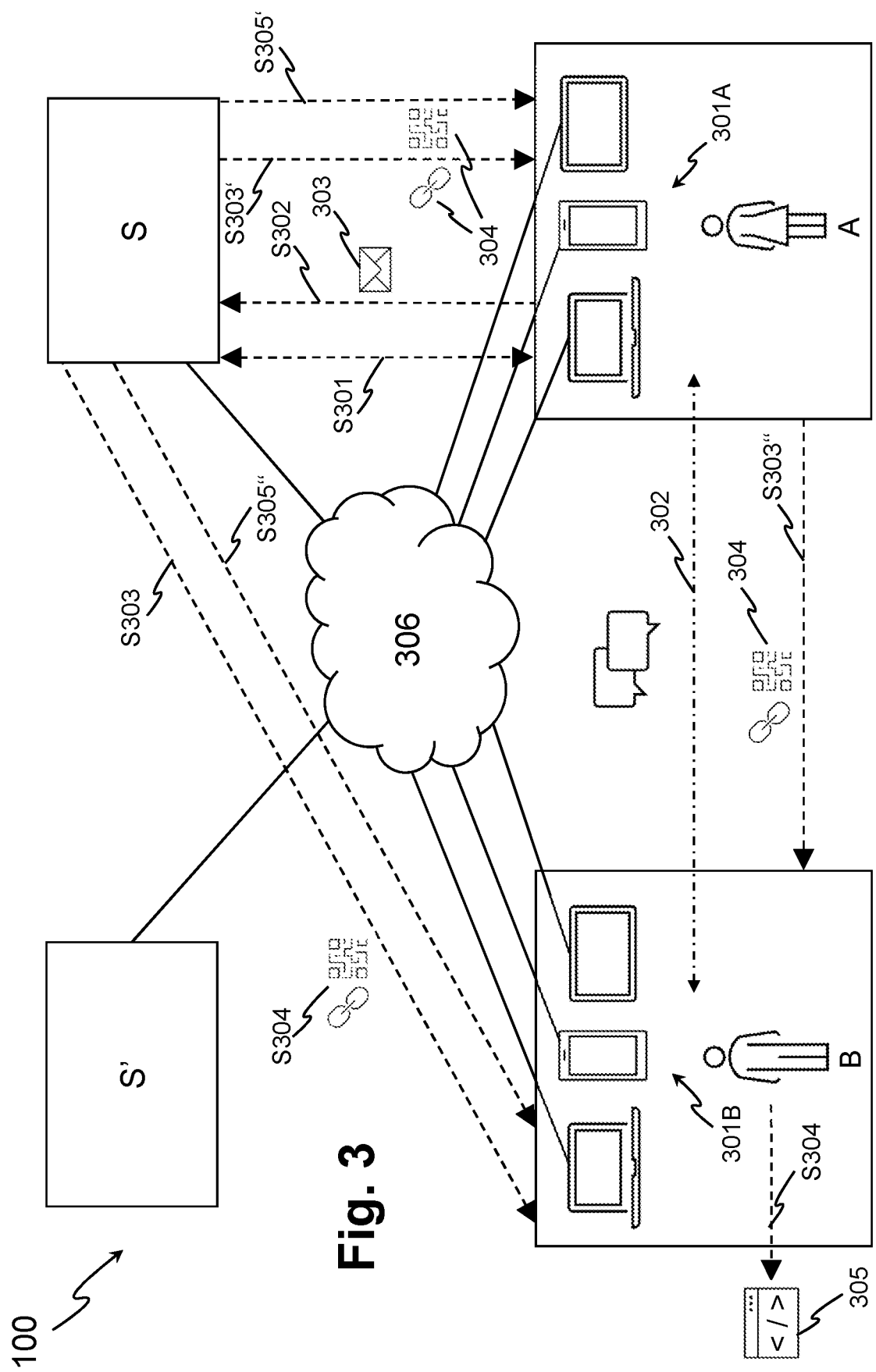

METHOD AND SYSTEM FOR USER AUTHENTICATION

CROSS-REFERENCE TO RELATED APPLICATIONS

The present application claims priority to European Patent Application No. EP 21 211 517.4 filed on Nov. 30, 2021. The entirety of this European patent application is incorporated by reference herein.

FIELD

The present invention relates to a method and system for user authentication and to a respective program element as well as a computer-readable medium.

BACKGROUND

Identity fraud and social hacking are an increasingly threatening security problem. User accounts get hacked or taken over and the communication channel is then used to get security or privacy sensitive data.

In many cases, access is granted by a username and a password. However, it has been shown this method may include some security issues when more and more digital services are used by customers. For their convenience, users try to simplify the access and users may choose passwords in a way that may allow exploring them by applying simple brute force algorithms. Also, social hacking is an issue. It has been shown that customers still may not be sensitive enough to not provide the username and password to a foreigner.

This simple way of authentication became a problem especially for online banking services. Thus, driven primarily by the banks, methods for two-factor authentication have been introduced in order to increase the security level.

However, also two-factor authentication can be a security problem because such methods only protect the access to a service. Once a user has access to a system and/or service no further verification of the user's identity is made.

The article "WhatsApp Adds Biometric Authentication To Web, Desktop Version", of Jan. 28, 2021 and published under https://in.mashable.com/tech/19884/whatsapp-adds-biometric-authentication-to-web-desktop-version", shows how face and fingerprint can be used for unlocking.

SUMMARY

A method and system for user authentication, a respective program element and computer-readable medium can be provided that can provide a more efficient authentication.

For example, a method for user authentication during a connection between a first user and a second user can include receiving an authentication request from the first user for authenticating the second user. The method can also include executing an authentication process of the first user and receiving contact data of the second user from the first user. Then, a Token can be sent to the second user wherein the Token is based on and/or addressed by the contact data provided by the first user and executing an authentication process of the second user based on the Token is requested. The method may further include generating a result for the authentication process for the second user and providing the result of the authentication process of the second user to the first user and/or to the second user.

Embodiments of the method may allow an increase in the security level even for communication systems that only offer basic authentication mechanisms but can also be used to enhance the security level of systems that are on a higher security level e.g. by using two-factor authentication.

In addition to a user-to-system authentication in order to get access to the system, further protection may be achieved. In an example, the access to a system, e.g. a chat application, is compromised and/or hacked. After such a successful attack to the system, the other party may not have the possibility to detect such a fraud as they assume after the grant of the access to the system the intended person is using the system. A connection between two parties may only have the user accounts as end points. In this way, once access to the user account is granted any communication may be possible.

However, the proposed method could make it possible for the other user to trigger a re-authentication with a very high security standard, e.g. using biometric authentication so that both communicating users are authenticated to another and not only to the communication system and in particular to accounts of the communication system.

In other words, in addition to mechanisms for authenticating users against systems, a mechanism is established that allows for a user-to-user authentication. Typical mechanisms for authenticating users against systems are two-factor authentication mechanisms. Two-factor authentication mechanisms are used to increase the security of users logging on to systems, e.g. further to an authentication by simply using a username and/or password an additional second factor is requested, e.g. a code received via SMS needs to be provided in order to get access to system.

According to a further aspect of the present invention, the contact data can include at least one contact data of the list of contact data consisting of an email, a mobile number, a telephone number, and a profile image. In a further example, the contact data may also comprise a public key.

The contact data thus may be any information usable to reach and/or address the second user. This information may ensure that the second user has access to contact data which is known to be controlled by the second user. In an example contact data differs from account data for the account that is used for the connection between the first and the second user. Consequently, in case the second user can be reached via his or her contact data the reliability of the authenticity of the second user is increased. Particularly the contact data may be contacted during an existing and/or established connection such as a chat and/or a voice call and/or a data call. Thus, the second user may need to react very quickly to information sent via the contact data and the time for manipulating the access data may be short.

The contact data may differ from information that is used for the two-factor authentication. In such a way, the contact data may allow to establish an additional channel for authentication and/or a further factor of authentication beyond the two-factor authentication that is used to access the account via which the connection with the first user is established. The contact data may be contact data allowing for a contact with a quick response time, e.g. the response time is shorter than the duration of the established connection. In other words, a written letter sent by post and a corresponding postal address may not be appropriate as contact data to be verified during the connection.

According to another aspect of the present invention, the Token can be at least one Token selected from the list of Tokens consisting of a unique link, a call from an Interactive Voice Response system (IVR), a code, a QR (Quick Response) Code, and a Hash Value.

The Token may be generated very quickly and exist only for a predetermined time range. In this way, the Token may be a temporary identification information that is generated independently from the user. The Token may ensure that the second user is not only reached by his or her contact data but also receives information via the contact data that is only available for a short time and may not be predictable.

By allowing the first user to choose the type of contact data to authenticate the second user during a connection, an additional security level can be provided as the second user may not predict which contact data the first user choose to authenticate the second user during the connection. In other words, whereas a person may be able to find out access information to compromise the access to the communication system, the online authentication and/or user-to-user authentication may not provide the second user enough time to compromise the additional authentication request which may be difficult to predict.

According to yet another aspect of the present invention, the Token is sent to the second user directly or via the first user. In this way it is possible to ensure that the user-to-user authentication is sent to the second user who actually is in connection with the first user. In one case the actually established connection is used to transfer the Token in-band of the connection and/or communication. In the other case, contact information is used that is known to be associated with the second user.

According to a further aspect, the authentication process of the first user and/or the authentication process of the second user can include using biometric data. Biometric data may provide an additional security level as it may be difficult to manipulate them within a short time frame like, for example, when requested during a communication connection. According to an aspect of the present invention, the biometric data is at least a biometric data selected from the group of biometric data consisting of a human pattern, a fingerprint, a face identifier and voiceprint. The biometric data may comprise body features of the user.

According to a further aspect of the present invention, providing the result of the authentication process can include providing the Token and/or a requestID. The provision of the Token and/or the requestID may indicate a successful user-to-user authentication. The requestID may be an identifier generated by the system.

According to another aspect of the present invention, a system for user authentication during a connection between a first user and a second user exists is provided. The system can include an input/output device and an authentication device, wherein the input/output device is adapted for receiving an authentication request from the first user for authenticating the second user. The authentication device can be adapted for executing an authentication process of the first user wherein the input/output device is further adapted for receiving contact data of the second user from the first user.

The input/output device can be adapted for sending a Token to the second user wherein the Token is based on and/or addressed by the contact data provided by the first user.

The authentication device can be adapted for requesting the execution and/or executing an authentication process of the second user based on the Token and for generating a result for the authentication process for the second user.

The input/output device can further adapted for providing the result of the authentication process of the second user to the first user and/or to the second user.

According to yet another aspect of the present invention, a program element is provided, which when being executed by a processor is adapted to carry out the method for user authentication. The program element can be stored in a non-transitory computer readable medium so that the processor can run the program element to cause the method defined by the program element to be carried out via a device having the processor (e.g. a smartphone, tablet, personal computer, laptop computer, etc.).

A non-transitory computer-readable medium may be, for example, a floppy disk, a hard disk, a solid state drive, an USB (Universal Serial Bus) storage device, a RAM (Random Access Memory), a ROM (read only memory), RFID (Radio-Frequency Identification) card or an EPROM (Erasable Programmable Read Only Memory). A computer readable medium may also be a data communication network, e.g. the Internet, which may allow downloading a program code.

It has also to be noted that aspects of the invention have been described with reference to different subject-matters. In particular, some aspects have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular combinations between features relating to the apparatus type claims and features relating to the method type claims are considered to be disclosed.

Other details, objects, and advantages of the telecommunications apparatus, system, device, and method will become apparent as the following description of certain exemplary embodiments thereof proceeds.

BRIEF DESCRIPTION OF THE DRAWINGS

The invention and embodiments thereof will be described below in further detail in connection with the drawings. The various embodiments and/or their individual sub-items and features can be combined with each other in any logical way. Even if some of the embodiments are described on the basis of a particular type of network architecture, they are explicitly not limited to them but can also be applied to other networks or communication system architecture as well. The drawings include:

FIG. 3 shows a structural message flow diagram according to an exemplary embodiment to the present invention.

The illustrations in the drawings is schematic and may not be to scale. In different drawings, similar or identical elements are provided with the same reference numerals.

Figure 1:
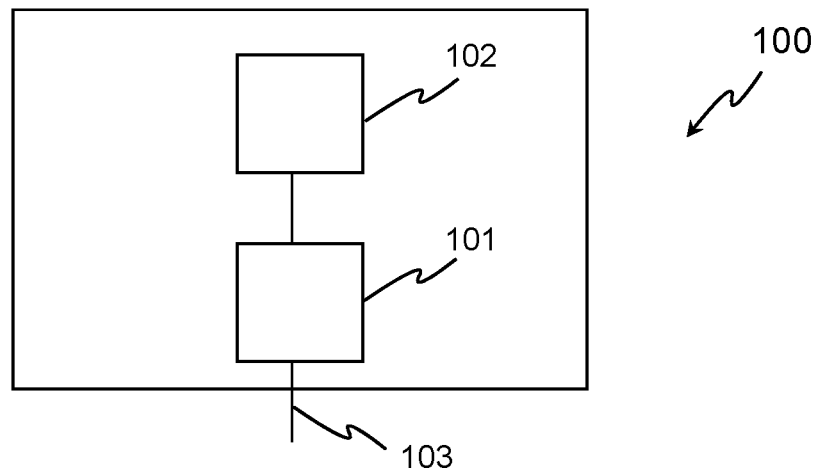
FIG. 1 shows a block diagram of a system for user authentication according to an exemplary embodiment of the present invention.

REFERENCE NUMERALS USED IN THE DRAWINGS INCLUDE 100 system for user authentication
101 input/output device 102 authentication device
103 input/output interface
A user A
B user B
S, S' authentication service hosted by an authentication service hosting device.
301A user devices of user A
301B user devices of user B
302 connection between user A and user B
303 contact data of user B
304 Token
305 authentication application
306 network
S200-S205 States of a method
S301-S305" States of a method

DETAILED DESCRIPTION

FIG. 1 shows a block diagram of a system 100 for user authentication according to an exemplary embodiment of the present invention.

The system 100 for user authentication during a connection between a first user A and a second user B exists and/or is established comprises an input/output device 101 and an authentication device 102, wherein the input/output device 101 is adapted for receiving an authentication request from the first user A for authenticating the second user B (the users are not shown in FIG. 1). The communication of the system 100 with the users A, B is made via the input/output interface 103 which may be connected to a voice and/or data network (not shown in FIG. 1), e.g. to the Internet.

The authentication device 102 is adapted for executing an authentication process of the first user A wherein the input/output device 101 is further adapted for receiving contact data (not shown in FIG. 1) of the second user B from the first user A. An example of an input/output device can include speakers and a microphone and/or a touchscreen display of a smartphone, tablet, or laptop computer, for example. The input/output device can also, or alternatively, include an input/output device communicatively connected to a user device (e.g. a Bluetooth connected input/output device, etc.). The authentication device 102 can include other components of the user device (e.g. other hardware of a smartphone, tablet, or laptop computer) or can be another type of device.

The input/output device 101 can be adapted for sending a Token (not shown in FIG. 1) to the second user wherein the Token is based on and/or addressed by the contact data provided by the first user A.

The authentication device 102 can be further adapted for requesting the execution and/or executing an authentication process of the second user B based on the Token 304 and for generating a result for the authentication process for the second user B.

The input/output device 101 can further be adapted for providing the result of the authentication process of the second user B to the first user A and/or to the second user B.

Figure 2:
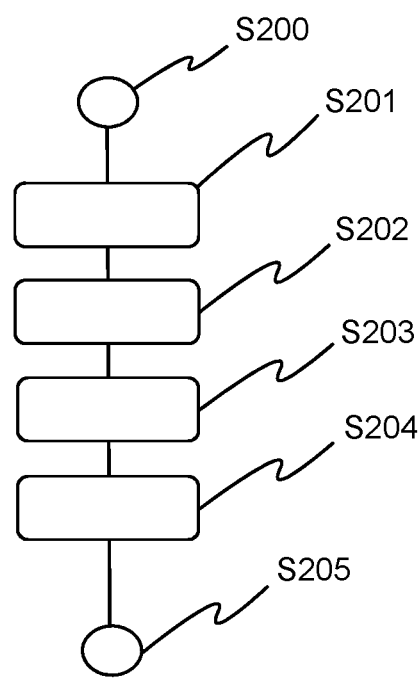
FIG. 2 shows a flow chart for a method for user authentication during a connection between a first user and a second user according to an exemplary embodiment of the present invention.

FIG. 2 shows a flow chart for a method for user authentication during a connection between a first user A and a second user B exists and/or is established according to an exemplary embodiment of the present invention. The method of FIG. 2 starts in an idle state S200. In state S201 an authentication request for authenticating the second user B is received from the first user A. In state S202, an authentication process of the first user A is executed with the system 100 and contact data of the second user B is received by the system 100 from the first user A. The system 100 can include a smartphone, a laptop computer, a tablet, a personal computer, or other type of user device that can include a processor connected to a non-transitory computer readable medium and at least one input device (e.g. a button, keyboard, keypad, a microphone, etc.), at least one output device (e.g. a speaker, a screen) and/or at least one input/output device (e.g. a touchscreen display).

The system 100 can also, or alternatively, be a separate device that hosts a service. An example of such a system can include a server that includes processor connected to a non-transitory computer readable medium and at least one transceiver unit. The server can be communicatively connectable to at least one input device (e.g. a button, keyboard, keypad, a microphone, etc.), at least one output device (e.g. a speaker, a screen) and/or at least one input/output device (e.g. a touchscreen display) as well. An example of such a server can be workstation or specifically adapted computer device, for example.

In state S203 a Token is sent to the second user B wherein the Token is based on and/or addressed by the contact data provided by the first user A and the execution of an authentication process of the second user B based on the Token is requested. In state S204 the method comprises generating a result for the authentication process for the second user B and providing the result of the authentication process of the second user B to the first user A and/or to the second user B. In state S205 the method is finished.

FIG. 3 shows a structural message flow diagram according to an exemplary embodiment to the present invention that may be employed in embodiments of FIG. 1 and/or FIG. 2. The diagram of FIG. 3 shows an example of how to provide an additional level of security between users by employing a user-to-user authentication. This user-to-user authentication helps to authenticate the users between another and in an example uses a two-factor authentication or a biometrical authentication. Such a user-to-user authentication and/or an "on-demand biometrical user-to-user mutual identification service" can be used in a way that users who are involved in an established communication can trigger or request such an authentication from the communication partner at any time. The mechanism of such an on-demand authentication is applicable to any communication and/or messaging solution.

The on-demand user-to-user authentication may provide confidence that the communication partner's account that is used for the communication was not compromised and/or hacked. In other words, the on-demand user-to-user authentication verifies during an ongoing communication that the partner, who is using a specific account, does not only have access to that account at the time of logging in but also during the ongoing communication. The on-demand user-to-user authentication may be implemented as an on-demand user account verification.

For demonstrating an example of an "on-demand biometrical user-to-user mutual identification service", FIG. 3 shows a first user A and a second user B. The first user A uses first user devices 301A and the second user B uses second user devices 301B as an input/output device.

Between first user A and second user B connection 302 of a chat app is established. Thereby, the chat app may comprise an authentication interface (see FIG. 1 reference 103). The connection 302 is independent from the device type 301A, 301B that either party is using and may be via a mobile device (mobile phone, tablet, smartwatch, etc.) or the web.

For FIG. 3 without any limitation to the general concept of user-to-user authentication, it is assumed that the account of user B is hacked, or a hacker takes over the account of user B pretending to be user B. Each account to which the respective user is logged in is the logical endpoint of the connection 302.

During the communication between user A and user B the fraudulent user B sends messages to user A asking for sensitive data. User A is suspicious and now wants to be sure that user B is really user B, e.g. the actual owner of the account which the second user B is using.

For the verification of the authorization of the second user B and the identity of user B, the first user A may employ an end-to-end mutual biometric authentication service S, for example offered by the operator of the chat platform or by a third-party operator. The operator of the on-demand user authentication service S may use the system 100 for user authentication. Service S is executed on the system 100. Further services S' may exist which offer similar authentication services.

Thus, S and/or S', comprising an authentication device (such as shown in FIG. 1 with reference 102).

For invoking the on-demand user authentication in state S301 the first user A authenticates himself or herself against or with the authentication service S, e.g. by using biometrical data. In order to use this service, the first user A has an account at the authentication service provider. This authentication service account may be different to the account used for the communication connection 302. The system 100 receives an authentication request for authenticating the second user B from the first user A. This request may be implicitly comprised in an authentication message sent from the first user A to the authentication service S running on the system 100. The system 100 may execute an authentication process of the first user A in order to verify that the first user A is registered for the authentication service S.

Together with the authentication request of user A to the service S or after such an authentication request, the first user A sends in state S302 a request to service S comprising contact data 303 of user B.

Dependent on the used service S, the contact data 303 may comprise an email, a mobile telephone number, a public key, a telephone number and/or a profile image of user B. The contact data may be any publicly available contact information that confirms the identity of the real user B. This contact data 303 of the second user B provided from the first user A informs service S about the communication partner B with whom user A is supposing to communicate with and the contact data 303 is received in the system 100, e.g. in the input/output device, and forwarded to the authentication device (not shown in FIG. 3).

Upon receiving the authentication request from first user A, the service S sends in state S303, S303', S303'' a Token 304 to the second user B wherein the Token 304 is based on and/or addressed by the contact data 303 provided by the first user A. The Token 304 is generated in the authentication device of system 100 and may comprise a unique link and/or a code identifying this particular authentication request (see FIG. 3, 304 is linked to a link icon and QR code icon).

The Token 304 is either directly sent to the second user B as indicated in state S303 or the Token 304 is indirectly sent via the first user A as indicated by states S303' and S303''. In other words, the Token 304 is intended to be used for authentication of the second user and is returned to the first user A or is directly sent to user B by using the official contact data 303.

If the Token 304 is sent via first user A to second user B, the first user A forwards this Token 304, in particular a link and/or a code, in state S303'' to user B.

If the Token 304 is sent directly from service S to user B, service S could also use any platform dependent service as, for example, an IVR service in order to contact the second user B. Thus, the service S is independent from platforms used by user A.

The message that is used to send the Token 304 may also comprise a request for authentication. In this way, an authentication process of the second user B based on the Token 304 is invoked. In an alternative example the authentication process is invoked just by receiving the message substantially without any additional request.

Upon receiving the Token 304 and/or a corresponding request, the second user B invokes in stage S304 the identification process by using the Token 304. In one example, where the Token 304 comprise a link, user B follows the received link and may receive a web page referred to by the link.

In another example where the Token 304 comprises a code, the user B and/or a corresponding user device 301B reads the code and starts a corresponding application 305 in order to authenticate user B via the authentication application 305 and/or identification application 305 by using the received code. The application 305 may be executed locally on one of the devices 301B of user B.

In yet another example where an IVR system may be used, user B may receive as Token 304 an automated phone call which is associated with user B and which may ask for a passcode and or recognize a voiceprint of user B. The passcode may have been provided in an additional Token 304.

In addition to or as an alternative to the previous examples, the authentication process may comprise biometrical identification like fingerprint, face identifier (faceID), voiceprint for authenticating the user B against the service S. Thereby, it is assumed that user B is already known to service S prior to executing the user-to-user authentication (e.g., user A and user B agree at one point that they are using the trusted service S for a potential authentication).

In an example for the authentication process, the Token 304 may be individualized for user B either by providing a code and/or a link to user B which includes a temporally valid feature or by using the fact that user B is already known to service S, e.g. via fingerprint.

The authentication process may also be provided by different locally distributed services S, S'.

The result and/or outcome of the authentication process of the second user B is generated by the service S, S' and is provided to the first user A and/or to the second user B as indicated in stage S305' and S305''.

In other words, either service S generates the result of the authentication process where user B authenticates against service S, e.g. in case of IVR or a link to a web page.

In another example, where user B may use a local authentication application 305 in stage S304, user B informs service S about the result. This result may be a calculated hash or signature that can only be verified by service S. If user B sends the result of a local application 305 running on a user device 301B, user B sends the result together with a requestID and/or a code that was provided by the service S in order to make an association between the request and the result. The requestID may be any identifier used to identify a specific Token 304.

After service S has collected the result of the authentication process, service S informs in stage S305' user A about the result of the authentication process and user A can be certain about the identity of B. In addition, in stage S305'', service S may also provide the result of the authentication process to user B.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for user authentication comprising:
   receiving an authentication request from a user device of a first user for authenticating a second user, the second user being a different user who is not the first user, the authentication request being received by an authentication device during an ongoing communication connection between the user device of the first user and a user device of the second user;
   the authentication device executing an authentication process of the first user;
   the authentication device receiving contact data of the second user from the user device of the first user that is selected by the first user;
   the authentication device sending a Token to the user device of the second user using the contact data of the second user received from the user device of the first user, wherein the Token is based on and/or addressed by the contact data provided by the first user;
   the authentication device requesting execution of an authentication process of the second user based on the Token;
   the authentication device performing the authentication process of the second user based on the Token such that biometric data of the second user entered via the second user device during the authentication process of the second user is compared with stored biometric data of the second user to verify that the second user of the second user device is the second user;
   the authentication device generating a result for the authentication process for the second user; and
   the authentication device providing the result of the authentication process of the second user to the first user and/or to the second user during the ongoing communication connection.

2. The method of claim 1, wherein the contact data comprises at least one of:
   an email address,
   a mobile number,
   a telephone number, and
   a profile image.

3. The method of claim 1, wherein the Token comprises at least one of:
   a unique link,
   a call from an Interactive Voice Response system,
   a code,
   a QR Code, and
   a Hash Value.

4. The method of one of claim 1, wherein the Token is sent to the second user directly or via the user device of the first user.

5. The method of one of claim 1, comprising:
   collecting the biometric data of the second user to store the biometric data of the second user, the collecting of the biometric data of the second user occurring prior to the receiving of the authentication request from the user device of the first user.

6. The method of claim 5, wherein the stored biometric data of the second user includes one or more of:
   a human pattern,
   a fingerprint,
   a face identifier, and/or
   a voiceprint.

7. The method of one of claim 1, wherein providing of the result of the authentication process comprises providing the Token and/or a requestID.

8. The method of claim 1, comprising:
   collecting the biometric data of the second user to store the biometric data of the second user as the stored biometric data, the collecting of the biometric data of the second user occurring prior to the receiving of the authentication request from the user device of the first user; and
   storing the biometric data as the stored biometric data in a non-transitory computer readable medium, the stored biometric data including data for a fingerprint of the second user, and/or data of a voiceprint of a voice of the second user.

9. A system for user authentication during a connection between a first user and a second user, the second user being a different user who is not the first user, the system comprising:
   an input/output device; and
   an authentication device, stored biometric data of the second user being accessible to the authentication device;
   wherein the input/output device is configured to receive an authentication request from the first user for authenticating the second user during an ongoing communication session between a user device of the first user and a user device of the second user;
   wherein the authentication device is configured to execute an authentication process of the first user;
   wherein the input/output device is configured to receive contact data of the second user from the first user;
   wherein the input/output device is configured to send a Token to the user device of the second user wherein the Token is based on and/or addressed by the contact data provided by the first user;
   wherein the authentication device is configured to request execution of an authentication process of the second user based on the Token during the ongoing communication session such that biometric data of the second user entered via the user device of the second user during the authentication process of the second user is compared with the stored biometric data of the second user to verify that the second user of the user device of the second user is the second user and is also configured to generate a result for the authentication process for the second user, the biometric data of the second user including a fingerprint; and wherein the input/output device is configured to provide the result of the authentication process of the second user to the user device of the first user and/or to the user device of the second user during the ongoing communication session.

10. The system of claim 9, wherein the stored biometric data of the second user also includes one or more of:
a human pattern,
a face identifier, and
voiceprint.

11. The system of claim 9, wherein the Token includes a unique link, a call from an Interactive Voice Response system, a code, a QR Code, and/or a Hash Value.

12. The system of claim 9, wherein the result for the authentication process for the second user includes a requestID.

13. The system of claim 9, wherein the user device of the second user is a communication device, a computer, a smartphone, a tablet, or a laptop computer.

14. The system of claim 9, wherein the authentication request from the first user for authenticating the second user is a message from a user device of the first user.

15. The system of claim 9, wherein the authentication device and the input/output device are components of an end-to-end biometric authentication service.

16. The system of claim 15, wherein the end-to-end biometric authentication service for a communication service hosted by at least one server that includes a processor connected to a non-transitory computer readable medium.

17. A non-transitory computer readable medium having a program element stored thereon that defines a method that is performed by a device when a processor of the device runs the program element, the method comprising:
receiving an authentication request from a first user for authenticating a second user during an ongoing communication session between a user device of the first user and a user device of the second user, the second user being a different user who is not the first user;
executing an authentication process of the first user;
receiving contact data of the second user from the first user;
sending a Token to the user device of the second user during the ongoing communication session, wherein the Token is based on and/or addressed by the contact data provided by the first user;
requesting execution of an authentication process of the second user based on the Token during the ongoing communication session;
performing the authentication process of the second user based on the Token during the ongoing communication session such that biometric data of the second user entered via a user device of the second user during the authentication process of the second user is compared with stored biometric data of the second user to verify that the second user of the user device of the second user is the second user;
generating a result for the authentication process for the second user during the ongoing communication session; and
providing the result of the authentication process of the second user to the first user and/or to the second user during the ongoing communication session.

18. The non-transitory computer readable medium of claim 17, wherein the device is a communication device, a computer, a smartphone, a tablet, or a laptop computer and wherein the biometric data of the second user includes a fingerprint and/or a voiceprint.

19. The non-transitory computer readable medium of claim 17, wherein the stored biometric data of the second user includes one or more of:
a human pattern,
a fingerprint,
a face identifier, and
voiceprint.

20. The non-transitory computer readable medium of claim 17, wherein the Token includes a unique link, a call from an Interactive Voice Response system, a code, a QR Code, and/or a Hash Value.

\* \* \* \* \*